United States Patent [19]
Palmon et al.

[11] Patent Number: 5,819,264
[45] Date of Patent: *Oct. 6, 1998

[54] ASSOCIATIVE SEARCH METHOD WITH NAVIGATION FOR HETEROGENEOUS DATABASES INCLUDING AN INTEGRATION MECHANISM CONFIGURED TO COMBINE SCHEMA-FREE DATA MODELS SUCH AS A HYPERBASE

[75] Inventors: Eran Palmon; Shai Geva, both of Tel Aviv, Israel

[73] Assignee: DTL Data Technologies Ltd., Tel-Aviv, Israel

[ * ] Notice: The term of this patent shall not extend beyond the expiration date of Pat. No. 5,740,421.

[21] Appl. No.: 541,688

[22] Filed: Oct. 10, 1995

Related U.S. Application Data

[63] Continuation-in-part of Ser. No. 415,601, Apr. 3, 1995, Pat. No. 5,740,421.

[51] Int. Cl.$^6$ .................................................. G06F 17/30
[52] U.S. Cl. ................................. 707/4; 707/3; 707/100; 707/102
[58] Field of Search ..................................... 395/603, 604, 395/605; 707/4, 3, 100, 102

[56] References Cited

U.S. PATENT DOCUMENTS

| | | | |
|---|---|---|---|
| 5,416,917 | 5/1995 | Adair et al. | 395/500 |
| 5,481,703 | 1/1996 | Kato | 707/101 |

OTHER PUBLICATIONS

Uffe Kock Wiil, "Issues in the Design of EHTS: A Multiuser Hypertext System for Collaboration", IEEE Publications, pp. 629–639, Jan. 1992.

J.L. Cybulski et al., "A Hypertext Based Software–Engineering Environment", IEEE Publications, pp. 62–68, Mar. 1992.

S. Chawathe, H. Garcia–Molina, J. Hammer, K. Ireland, Y. Papakonstantinou, J. Ullman, and J. Widom: "The TSIM-MIS Project: Integration of Heterogeneous Information Sources," in Proceedings of IPSJ Conference, Tokyo, Japan, Oct. 1994. Available via anonymous ftp from db.stanford.edu as/pub/chawathe/1994/tsimmis–overview.ps.

Y. Papakonstantinou, H. Garcia–Molina and J. Widom: "Object Exchange Across Heterogeneous Information Sources," in Proceedings of IEEE International Conference on Data Engineering, Mar. 1995. Available via anonymous ftp from db.stanford.edu as/pub/papakonstantinou/1994/object–exchange–heterogeneous–is.ps.

(List continued on next page.)

*Primary Examiner*—Thomas G. Black
*Assistant Examiner*—Greta L. Robinson
*Attorney, Agent, or Firm*—Dov Rosenfeld

[57] ABSTRACT

A method of performing a navigated associative search on a set of heterogeneous databases is described, the method implemented on a general purpose computer. The method comprises converting each database of the set of databases into a schema-free structure called a hyperbase. The hyperbases corresponding to each database of the set of databases are combined into a single combined hyperbase, and that single hyperbase is normalized into a single normalized hyperbase. An associative search on the single hyperbase includes providing a set of input words and a set of locations. The method of the present invention determines an answer, which is that sub-hyperbase of the hyperbase to be searched which has minimum "cost" according to a criterion. The location representing the object of the query answer also is determined. Once an answer is determined, the answer is displayed to the user. New queries may be navigated starting at a location or locations chosen by the user.

51 Claims, 6 Drawing Sheets

Microfiche Appendix Included
(1 Microfiche, 68 Pages)

OTHER PUBLICATIONS

H. Garcia–Molina, J. Hammer, K. Ireland, Y. Papakonstantinou, J. Ullman, and J. Widom: "Integrating and Accessing Heterogeneous Information Sources in TSIMMIS," in Proceedings of AAAI Spring Symposium on Information Gathering, Spring 1995. Available via anonymous ftp from db.stanford.edu as /pub/ullman/1995/tsimmis–abstract–a-aai.ps.

H. Garcia–Molina, Y. Papakonstantinou, D. Quass, A. Rajaraman, Y. Sagiv, J. Ullman, J. Widom: "The TSIMMIS Approach to Mediation: Data Models and Languages," in Proceedings of NGITS Symposium, Naharia, Israel, Jun., 1995. Available via anonymous ftp from db.stanford.edu as pub.ullman/1995/tsimmis–models–languages.ps.

M.W. Bright, A.R. Hurson, S. Pakzad. "Automatic Resolution of Semantic Heterogeneity in Multidatabases," in ACM Transactions on Database Systems, vol. 19, No. 2, Jun. 1994, pp. 212–253.

M. Gyssens, J. Paradaens, D. Van Gucht: "A Grammar--Based Approach Towards Unifying Hierarchical Data Models," in Proceedings of SIGMOD Conference, 1989, pp. 263–272.

A. Poulovassilis, M. Levene: "A Nested–Graph Model for the Representation and Manipulation of Complex Objects," in ACM Transaction on Information Systems, vol. 12, No. 1, Jan. 1994, pp. 35–68.

Chawathe et al., "The TSIMMIS Project: Intgration of Heterogeneous Information Sources", in Proceedings of IPSJ Conference, Tokyo, Japan (cited on PTO form 1449) Oct. 1994.

Uffe Knock Wiil, "Issues in the Design of EHTS: A Multiuser Hypertext System for Colaboration", IEEE on CD ROM, pp. 629–639, Jan. 1992.

|     | SALARY SPREADSHEET | 001 | 002 |
|-----|--------------------|-----|-----|
| 1993 | | $73,000 | $65,000 |
| 1994 | | $80,000 | $82,000 |

ASSOCIATIVE SEARCH METHOD WITH NAVIGATION FOR HETEROGENEOUS DATABASES INCLUDING AN INTEGRATION MECHANISM CONFIGURED TO COMBINE SCHEMA-FREE DATA MODELS SUCH AS A HYPERBASE

The present application is a continuation-in-part of co-pending U.S. patent application Ser. No. 08/415,601 now U.S. Pat. No. 5,740,421, filed Apr. 3, 1995, and entitled ASSOCIATIVE SEARCH METHOD FOR HETEROGENEOUS DATABASES WITH AN INTEGRATION MECHANISM CONFIGURED TO COMBINE SCHEMA-FREE DATA MODELS SUCH AS A HYPERBASE (the "Parent Invention"), the priority of which is hereby claimed pursuant to 35 U.S.C. § 120, and the entirety of which is incorporated herein by reference.

MICROFICHE APPENDIX

A 68-page microfiche appendix consisting of one sheet and 68 frames of an unnumbered cover page and 67 consecutively numbered pages is submitted as part of this application and incorporated herein. The computer programs in the microfiche appendix are copyright DTL Data Technologies Ltd.

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

I. BACKGROUND OF THE INVENTION

A. Field of the Invention

The field of the present invention is searching heterogeneous database systems and other systems for maintaining information in computers.

B. Related Application Under 35 U.S.C. § 120

C. Some Definitions

The present invention deals with maintaining information, where information is anything that can be displayed to and that is comprehensible to humans and maintaining information is carrying out on a computer the necessary processes for storing, retrieving, and manipulating information. In particular, the present invention deals with retrieving information.

The present invention is applicable to all information, including textual and pictorial information. Textual information is data that can be spoken. Such data is stored in words, where a word is a list of characters. While embodiments of the present invention are described for textual information, extension to other types of information would be apparent to one skilled in the art.

Textual data can be either natural language text, consisting of words that are arranged in sentences with natural grammar rules, or formatted data text (also called raw data text), consisting of words that are arranged in data structures such as tables, trees, sets of tables, lists of records, etc.

The art of databases deals with all aspects of maintaining such formatted data, including storage on disks, concurrency control, etc. The method of the present invention involves searching information, and deals with the structural aspects of databases: the methods of (logically) representing information using computers, defining a query on databases, and displaying information.

A data-model is a generic data structure such as a table. For example, a relational data model is a set of tables. A table is a set of rows, each with the same number of columns. All rows in a particular column of a table share the same attribute. Each table typically is "a file", each row of a table is "a record of the file," each column in a row is a "field of a record," and each column having its particular attributes— "the attributes of the field."

Figure 3:
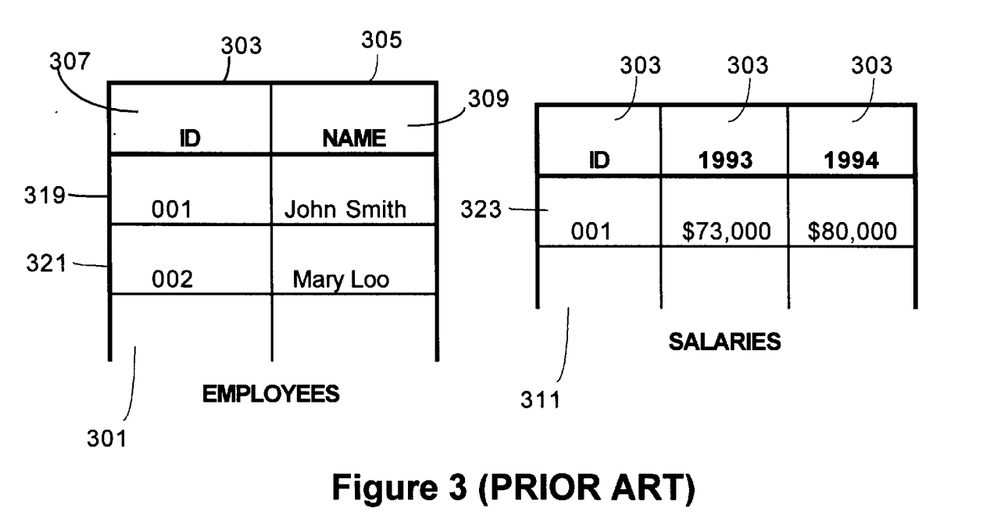
FIG. 3 shows the database referred to herein as PERSONNEL.

A schema, defined with reference to a particular data model, is an instance of the particular data model, with parameters provided and words associated to the data model and its attributes. For example, a schema can be a table defined to have some fixed number of columns, a table name, and the attributes of the columns. For example, FIG. 3 shows a relational model consisting of two tables, EMPLOYEES and SALARIES. The schema for this relational model is as follows. The first table 301 is called EMPLOYEES and has two columns, the first column 303 is called ID and the other column 305 is called NAME. That is, the first column has the attribute 307 ID and the second has attribute 309 NAME. Each row (or record) of the table consists of a number for an employee (in the ID column) and the employee's name (in the NAME column). The second table 311 is called SALARIES and has three columns, having attributes ID, 1993, and 1994 denoted in FIG. 3 by 313, 315, and 317 respectively. Each record of SALARIES consists of a number for an employee (in the ID column), that employee's salary for 1993 (in the 1993 column), and that employee's salary for 1994 (in the 1994 column).

A database instance is an instance of a schema with the schema's parameters set. For example, if the schema is a table defined to have some fixed number of columns, a table name, with each of the columns having some attributes, then the instance would have a particular number of rows (or records) and the table's elements would have words associated to them. For the above schema for the relational model consisting of the tables EMPLOYEES and SALARIES, FIG. 3 shows the database with table EMPLOYEES containing two rows (or records), the first 319 with ID 001 and NAME John Smith, and the second 321 with ID 001 and NAME Mary Lu, and table SALARIES containing one row 323 with ID 002, 1993 $73,000 and 1994 $80,000. This database is referred to below as PERSONNEL.

A query is a function, that is, a mapping, from a particular database into a substructure of the database. That substructure is called the answer of the query. The answer has particular parameters (words) that may be both from the schema of the database and from the data itself. Thus, an answer can be viewed as an instance of a data structure.

For example, the following defines a query on PERSONNEL:

select ID and 1993 from SALARIES where ID=001

This would provide an answer consisting of a table with two columns with attributes ID and 1993, respectively. These are from the attributes of the schema of PERSONNEL. The answer table would have one row consisting of 001 in column ID and $73,000 in column 1993. The contents of the row are from the data of database PERSONNEL.

In this specification, a note refers to a list of lines of words. Thus, an unstructured (except for lines) block of text is a note.

A grid is a structure which can store grid-like items of information, for example, a spreadsheet. A grid can thus be thought of as a table where both the columns and rows have attributes (i.e., names). This is slightly different from a table in a relational database, where only columns have attributes or names, and each row is a record.

A thesaurus entry (also called a thesaurus) is a list of phrases, where each phrase is a set of words. The phrases in a thesaurus entry typically each have similar meaning. In most cases, the phrases will consist of one word only, in which case a thesaurus is a set of words that have similar meaning.

A stem is similar to a thesaurus in that it consists of a set of words. In this case, the words are all morphological variants of the same root. For example, a stem might contain the words salaries and salary.

A grouped structure is a set of some of the above structures, with a name given to the set of structures to indicate that the set's component structures are all grouped together under that name.

An associative search is a query that takes a list of words (a phrase) as input and determines output which consists of a set of answers, sorted by relevance, where each answer is as defined above; an answer can be viewed as a set of phrases from the database or databases being searched.

An associative search with navigation, also called a navigated associative search, is an associative search with one or more guided and directed steps. That is, an incremental, user- or client-application-directed associative search. A user or client application or another program issues successive associative search queries, with each successive query optionally relying on the answer to one or more former queries. For example, a user or program issues successive queries, and the user or program is presented with a list of answers to the current queries, ordered by some score. New answers are added to the list after each increment. The search is guided by choosing one or more answers in the list as input to a new query, optionally with additional words.

The method of the present invention involves carrying out a navigated associative search simultaneously on several heterogeneous databases. That is, on data which may be spread over several different database management systems. These systems may be incompatible with each other, use different data structures, and have their own different query languages. These systems might include relational data, notes, thesauri, stems, and/or grouped structures.

The method of the present invention is not limited to the data structures defined above, and may by extended easily to include other types of structures. How to carry out such an extension would be clear to one in the art from the present specification.

D. Description and Shortcomings of Prior Art Methods

The present invention describes a method for performing navigated associative searches of several heterogeneous databases. The method overcomes many of the shortcomings of the prior art methods for searching heterogeneous databases. Some of the shortcomings include: the need for programming and database know-how, the need for database structure and data formatting, the need for common representations to enable integrating data from different databases, the difficulty in performing a "fuzzy" search and the difficulty in using ambiguous data. The reader is referred to the Parent Invention for a detailed description of these shortcomings, and how the method of the Parent Invention overcomes the shortcomings by: 1) using a data model with no schema so that a user does not need to know attributes such as fields; 2) using a query syntax which is simply a list of words so that the user need not know database concepts, navigation or manipulation operations; 3) not requiring formatting or any other work prior to data entry; 4) not requiring common data-structures to be used, thus eliminating the need for tedious data integration or concession from heterogeneous databases; and 5) providing a method for finding not only exact matches, but also fuzzy or associative matches.

A recent prior art method for searching heterogeneous databases called "Tsimmis" is disclosed in: 1) S. Chawathe, H. Garcia-Molina, J. Hammer, K. Ireland, Y. Papakonstantinou, J. Ullman, and J. Widom, "The TSIMMIS Project: Integration of Heterogeneous Information Sources," in Proceedings of IPSJ Conference, Tokyo, Japan, October 1994 (available via anonymous ftp from db.stanford.edu as /pub/chawathe/1994/tsimmis-overview.ps); 2) Y. Papakonstantinou, H. Garcia-Molina and J. Widom, "Object Exchange Across Heterogeneous Information Sources," in Proceedings of IEEE International Conference on Data Engineering, March 1995 (available via anonymous ftp from db.stanford.edu as /pub/papakonstantinou/1994/object-exchange-heterogeneous-is.ps); 3) H. Garcia-Molina, J. Hammer, K. Ireland, Y. Papakonstantinou, J. Ullman, and J. Widom, "Integrating and Accessing Heterogeneous Information Sources in TSIMMIS," in Proceedings of AAAI Spring Symposium on Information Gathering, Spring 1995 (available via anonymous ftp from db.stanford.edu as /pub/ullman/1995/tsimmis-abstract-aaai.ps); and 4) H. Garcia-Molina, Y. Papakonstantinou, D. Quass, A. Rajaraman, Y. Sagiv, J. Ullman, J. Widom, "The TSIMMIS Approach to Mediation: Data Models and Languages," in Proceedings of NGITS Symposium, Naharia, Israel, June, 1995 (available via anonymous ftp from db.stanford.edu as pub/ullman/1995/tsimmis-models-languages.ps). Tsimmis uses a common data model called Object Exchange Model (OEM), in which all objects and their subobjects have what are called "labels" that describe their meaning. The structure imposed and the inclusion of labels mean that OEM is not a schema-free structure. It should be noted that these labels are not the same as the "labels" in the Parent Invention and in the preset invention. A query language called "OEM-QL" is used in Tsimmis for searching and requesting OEM objects. OEM-QL adapts SQL-like languages for object oriented models.

Tsimmis still suffers from some of the shortcomings of other prior art methods, including the need for programming and database know-how (to use OEM-QL) and the difficulty in performing a "fuzzy" search. The methods of the Parent Invention and the present invention, on the other hand, use a data model with no schema (OEM is not schema-free), use a query syntax which is simply a list of words rather then a query language like OEM-QL language; and provide a method for finding not only exact matches, but also fuzzy or associative matches.

The present application improves upon the method of the Parent Invention by adding navigation.

II. SUMMARY OF THE INVENTION

An improved method of performing a navigated associative search on a set of heterogeneous databases is described. In one embodiment, the method is implemented on a general purpose computer. The method comprises converting each database of the set of databases into a schema-free structure called a hyperbase. A hyperbase is a "generalized" graph in that it has typed nodes, more than one kind of node, more than one kind of edge, and labels, where the labels are the elementary items of information, and are text words in one embodiment. The hyperbases corresponding to each database of the set of databases are combined into a single combined hyperbase, and that single hyperbase is normalized into a single normalized hyperbase. It is this single hyperbase which is searched.

A navigated associative search involves providing a set of input words and a set of locations, the locations representing the main objects of previous answers with possible ways in which a search may be continued. The method of the present invention determines an answer, which is that sub-hyperbase of the hyperbase to be searched and has minimum "distance" according to a criterion. The method also provides a location for the answer. In one embodiment, a list of sub-hyperbases is returned to the user, the list ordered according to distance.

Several distance criteria may be used in the invention. In one preferred embodiment, the number of input words that is in the hyperbase is maximized. In another, the number of edges in the sub-hyperbase is used. In another embodiment, a partial node method is used.

Once an answer and location are determined, the answer is displayed to the user. In one embodiment, the list of words in the sub-hyperbase is displayed. Yet another uses remote hypertext or other communications protocols, for example, the HTTP protocol to accept input and present answers to remote users, commonly used on the Internet's "World Wide Web." In another, the sub-hyperbase is graphically displayed.

In another embodiment, a navigated associative search is carried out incrementally by enabling the user or a client application program to issue successive queries. The user (or a client application) is presented with the current list of answers to the current query. The user may direct the overall search process by activating or deactivating previous queries, and forming new queries. The input to a new query comprises input words or one or more locations selected by the user, or both a list of words and a list of locations.

IV. DESCRIPTION OF THE PREFERRED EMBODIMENT

A method for carrying out a navigated associative search of heterogeneous databases is described. In the following description, numerous specific details are set forth in detail in order to provide a more thorough understanding of the present invention. It will be apparent, however, to one skilled in the art, that the present invention may be practiced without these specific details. In other instances, well known features have not been described in detail so as not to obscure the present invention.

A. Implementation on a Computer System

Figure 2:
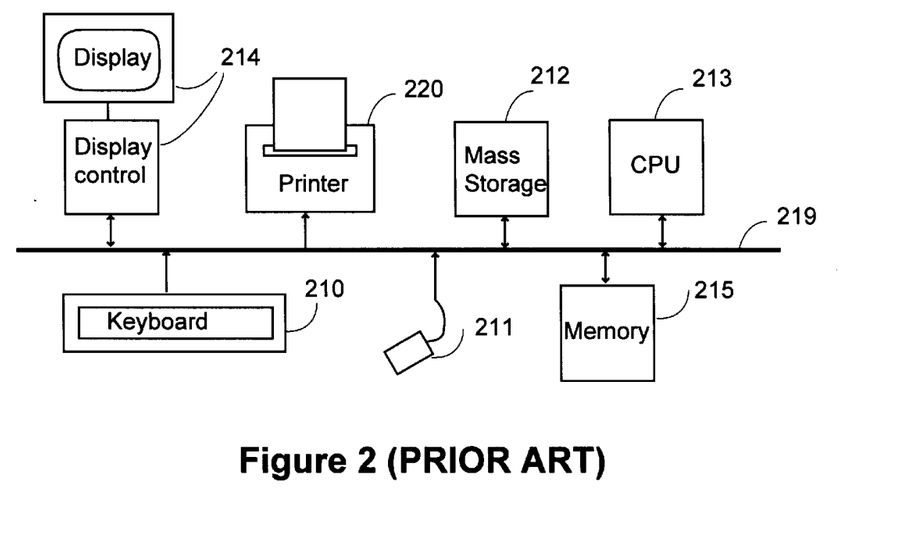
FIG. 2 shows an example embodiment of a computer system on which the invention may be implemented.

The present invention may be implemented on any conventional or general purpose computer system or computer-based data system. An example of one embodiment of a computer system for implementing this invention is illustrated in FIG. 2. A keyboard 210 and mouse 211 are coupled to a bi-directional system bus 219. The keyboard and mouse introduce user input to the computer system and communicate that user input to CPU 213. The computer system of FIG. 2 also includes a video memory and display 214, main memory 215 and mass storage 212, all coupled to bi-directional system bus 219 along with keyboard 210, mouse 211, and CPU 213. The mass storage 212 may include both fixed and removable media, such as magnetic, optical or magnetic optical storage systems, or any other available mass storage technology. The mass storage may be shared on a network, or it may be dedicated mass storage.

In one embodiment of this invention, the CPU 213 is a 32-bit or 64-bit microprocessor. However, any other suitable microprocessor or microcomputer may be utilized. Main memory 215 is comprised of dynamic random access memory (DRAM) and in the preferred embodiment of this invention, comprises at least 8 megabytes of memory. More or less memory, or a different type of memory may be used without departing from the scope of this invention. Video memory and display 214 consists of a cathode ray tube (CRT) raster monitor connected to a dual-ported video random access memory. This invention consists, for example, of 2 megabytes of memory. However, more or less video memory may be provided as well.

The computer system is also coupled to a printer 220, which may be a laser printer and may be connected via a network.

The computer system described above is for purposes of example only. The present invention may be implemented in any type of computer system processing environment or on special purpose hardware. The present invention also can be built into hardware such as large scale integrated (VLSI) circuits.

B. The Structure of Hyperbase

As in the Parent Invention, the method of the invention requires converting data to be in a particular structure that has no schema. As a first step, all data, whether in relational databases, tables, text notes, lists of words (thesauri and stems), grids, grouped structures, etc., are converted to this common structure. The method next queries the structure. The preferred embodiment uses a structure, which, in this specification, as in the Parent Invention, is called a hyperbase. The invention, however, is not limited to using a hyperbase. Other schema-free data models that are similar may be used, and the modifications needed to the method of the present invention to use these alternate data models will be clear to one in the art. For example, the present invention may be embodied using the grammar model of Gyssens et aL in M. Gyssens, J. Paradaens and D. Van Gucht, "A grammar-based approach towards unifying hierarchical data models," Proceedings, ACM Conference on Data Modeling (SIGMOD 89), pp. 263–272, 1989. However, the Gyssens et al. model is limited to hierarchical structures. In addition, use of such a model may require queries to have knowledge about the structure, whereas using the hyperbase model does not require knowledge of the structure.

The nomenclature used to describe the hyperbase structure is fully described in the Parent Invention and summarized herein. The elements of hyperbase are called labels and nodes. In this description of the method of the invention, labels will be words, although the invention is not limited to such labels. A node contains no information other than its relation to a label or to one or more other nodes. A label cannot exist by itself; it is always associated with a node. The word object will sometimes be used as a synonym for node. The relation of a node to one or more other nodes is indicated diagramatically by directed edges. A simple directed edge connects from a node called the parent (of the edge) to a node called the child (of the edge). When several edges emanate from one parent, these edges are ordered. On the other hand, when one node is the child of several parents, there no ordering of the parents. A leaf node is a node with no children. A root node is a node with no parents. An equivalence directed edge is used to indicate the equivalence of two nodes, the reference and the referenced node; the direction is from the reference node to the referenced node.

A node may be marked as a display node, and a display node may further be marked as a fact. A node also has a type from an extensible list of types, including word, string, field-name, record, cell, note, file, morphological stem, thesaurus-entry, etc.

In a hyperbase, a node can have either a label or one equivalence edge directed to it, or no label and no equivalence edge. Every leaf node has a label associated with it. A hyperbase cannot have any loops of equivalence edges or of simple directed edges. Finally, on every route of simple (non-equivalence) edges in the same direction from a leaf to a root, there is at least one display node.

Figure 1:
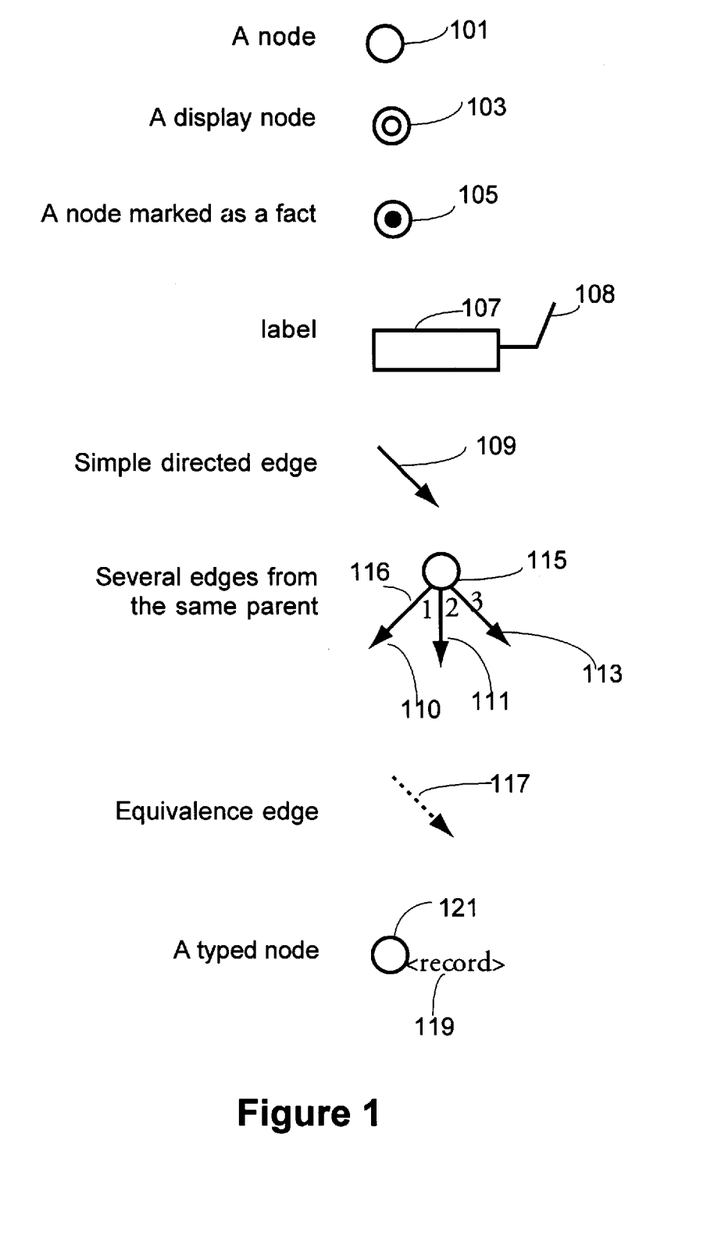
FIG. 1 illustrates the symbols used in this specification for drawing a hyperbase.

In order to carry out a navigated associative search, the concept of location in a hyperbase is now introduced. A location in a hyperbase is two sets of hyperbase nodes, the first set containing what are called the object nodes of the location and the second set containing what are called the forbidden nodes of the location. A location is associated with the results of a search and represents the possible ways a search may be continued. A search with navigation is a search that starts from a particular location or from a set of locations. The result of any incremental search includes one or more locations. In one preferred embodiment of the present invention, a location is a single node in the hyperbase. FIG. 1 illustrates the symbols used in this specification for drawing a hyperbase. A node 101 is indicated by a simple small hollow circle. A display node 103 is indicated by a smaller unfilled circle inside the main node circle. A fact 105 is indicated by that smaller circle being filled in. A label 107 is indicated by a small rectangle with a line 108 connecting that rectangle to the node associated with the fact. A simple edge 109 is indicated by an arrow from the parent node to the child node. The ordering on an edge (shown as a simple directed edge 110) when there are more edges (shown as 111 and 113) from the same parent 115 is indicated by an integer 116 on the edge. An equivalence edge 117 is indicated by a broken-line arrow. When a node is typed, the type 119 is indicated alongside the typed node 121.

A hyperbase is said to be in Normal Form 1 if: (a) no two labels are the same; (b) no two nodes have the same label; (c) no two nodes have the same reference; and (d) no two unlabeled, unreferenced nodes have the same list of children. A hyperbase is said to be in Normal Form 2 if it is in Normal Form 1 and a label is associated only with a leaf. In the preferred embodiment, data is converted to a hyperbase of Normal Form 1 and 2, although the invention may be made operative with hyperbase structures that are not in these forms as would be clear to one in the art.

A walk from a node $n_1$ to a node $n_2$ is a finite alternating sequence of adjacent nodes and edges starting with node $n_1$ and ending with node $n_2$. A path from a node $n_1$ to a node $n_2$ is a walk from $n_1$ to $n_2$ that does not contain a repeated edge. A simple path from a node $n_1$ to a node $n_2$ is a path from $n_1$ to $n_2$ that does not contain a repeated node. A loop is a path that starts and ends in the same node. Two nodes $n_1$ and $n_2$ are connected if and only if there is a walk from $n_1$ to $n_2$. A hyperbase is connected if and only if, given any two nodes $n_1$ and $n_2$, there is a walk from $n_1$ to $n_2$.

C. Conversion to hyperbases

As in the Parent Invention, the first step in the method of the present invention is to convert to one or more hyperbases the various databases, notes, grids and/or thesauri groups that make up the heterogeneous databases to be searched.

It will be clear to one in the art that explicit conversion is not necessary to practice the present invention. It is sufficient that each of the databases in the art of heterogeneous databases is capable of being converted to a common structure such as a hyperbase.

In an alternate embodiment of the present invention, explicit conversion does not take place. All the steps of the method of the invention are carried out as if the databases in the set to be searched were converted to a common structure such as a hyperbase.

The following examples illustrate the results of converting a table, a note, a thesaurus, a stem and a grid to hyperbases. The reader is referred to the Parent Invention for details of the processes for carrying out these conversions according to one preferred embodiment of the Parent Invention and the present invention.

Figure 4A:
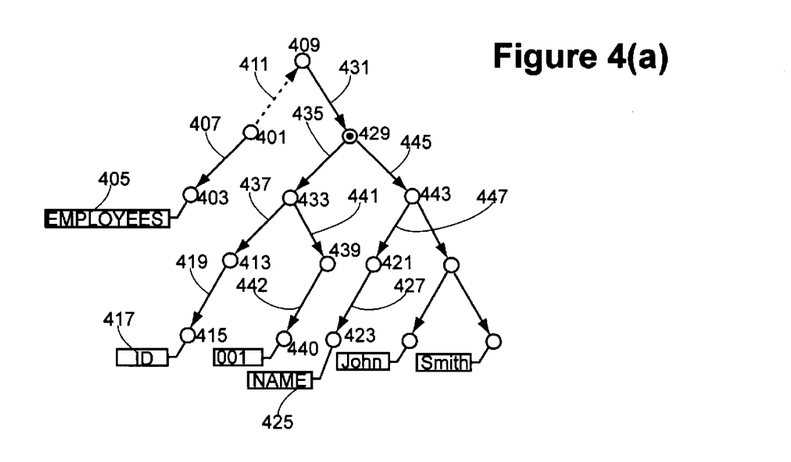
FIG. 4(a) shows a possible hyperbase representation of the first and second lines of the table EMPLOYEES.
Figure 4B:
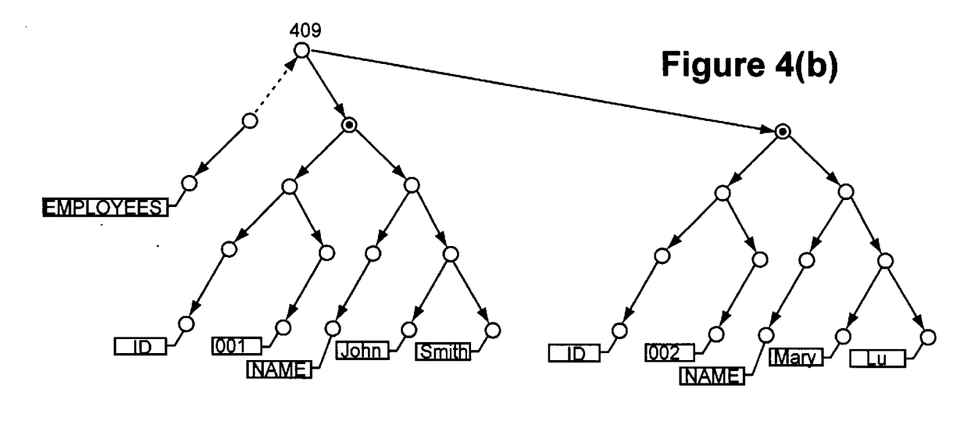
FIG. 4(b) shows a possible hyperbase representation of the first and second lines of the table EMPLOYEES.
Figure 4C:
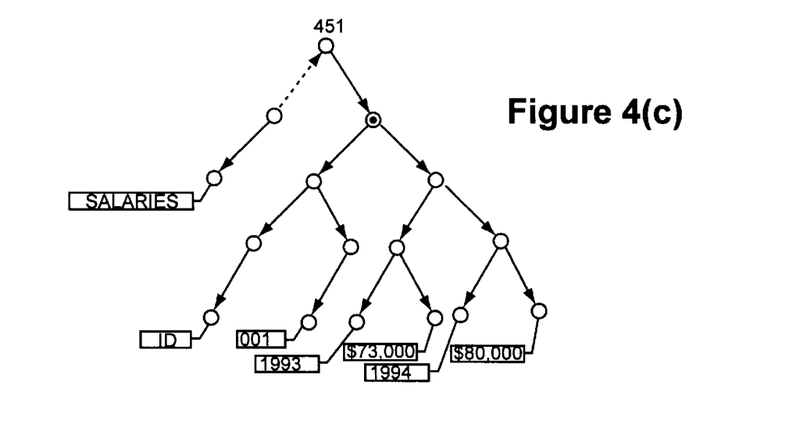
FIG. 4(c) shows a possible hyperbase representation of the table SALARIES.

Referring to FIG. 3, conversion of table 301 named EMPLOYEES results in the hyperbase of FIG. 4(b). Similarly, converting the table SALARIES 311 of FIG. 3 results in the hyperbase 451 shown in FIG. 4(c).

Figure 5:
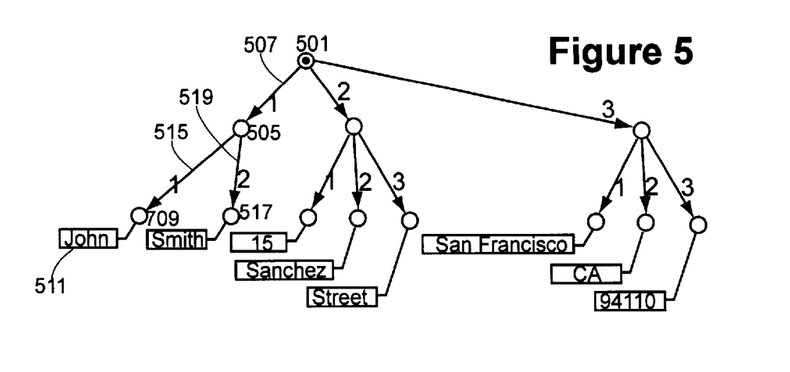
FIG. 5 shows the hyperbase of a note.

Conversion of the note: John Smith 15 Sanchez Street San Francisco, Calif. 94110 results in the complete hyperbase shown in FIG. 5.

Figure 6A:
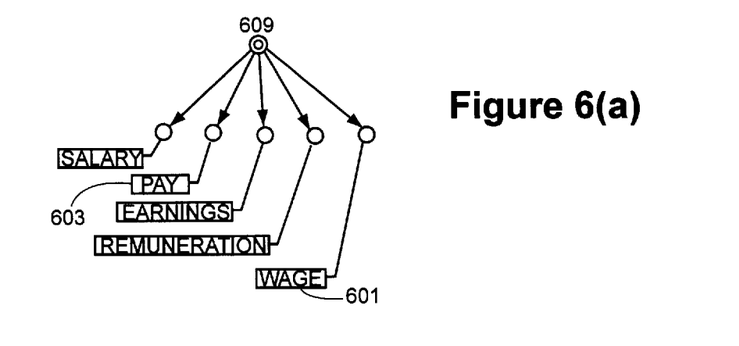
FIG. 6(a) shows the hyperbase of a thesaurus.
Figure 6B:
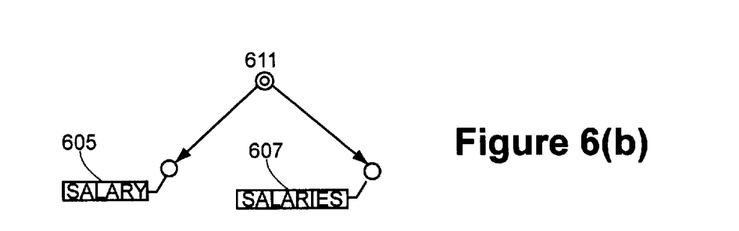
FIG. 6(b) shows the hyperbase of a stem.

A thesaurus is a set of words of similar meaning, and a stem is a list of words having the same root. FIG. 6(a) illustrates the hyperbase of the set of words {SALARY, PAY, EARNINGS, REMUNERATION, WAGE} which is a thesaurus. FIG. 6(b) illustrates the hyperbase for the set {SALARY, SALARIES } which is a stem.

Figure 7A:
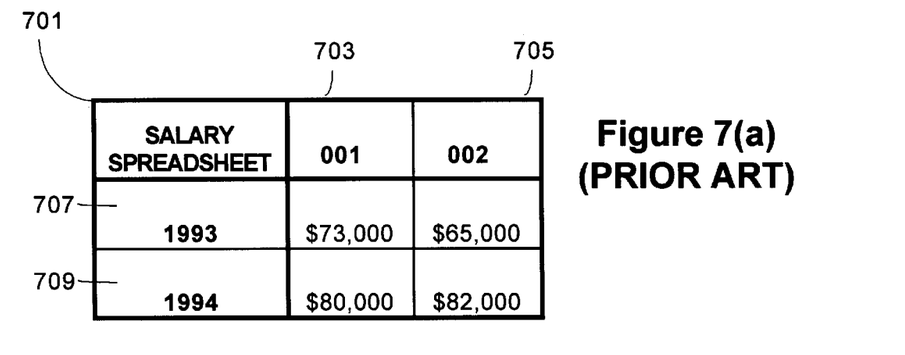
FIG. 7(a) shows a grid.
Figure 7B:
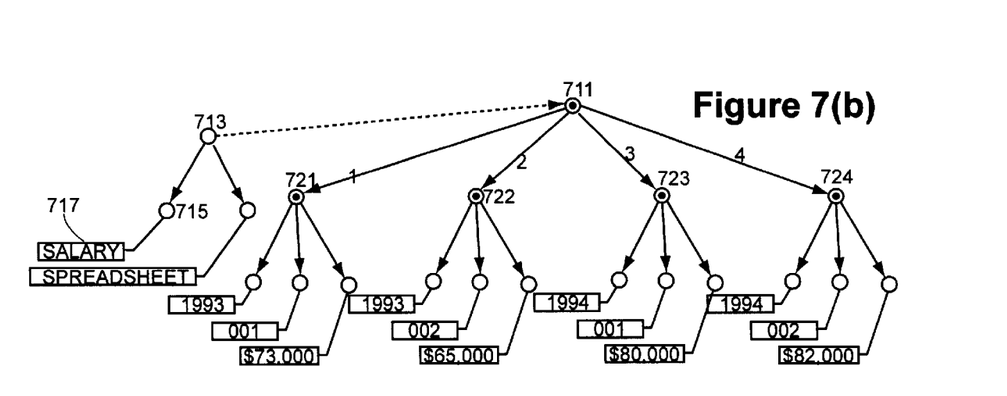
FIG. 7(b) shows the unnormalized hyperbase of the grid of FIG. 7(a).

A grid is a table where both columns and rows have names. A grid is used to store spreadsheets and other forms of tabular data. Converting grid 701 of FIG. 7(a) called SALARY SPREADSHEET, to a hyperbase results in the hyperbase of FIG. 7(b).

D. Normalization and integration

According to the Parent Invention, normalization is the process of converting a hyperbase to Normal Form 2. In the preferred embodiment of the present invention, all hyperbases are normalized. To normalize a hyperbase, one needs to deal with (a) any node that is not a leaf and that has a label associated with it; (b) any group of nodes that has the same label associated with each node in the group; (c) any group of nodes that has the same reference node referring to each node in the group; (d) any group of nodes where each node in the group has no label, is not a referred node, and has the same list of children; and (e) any labels that are the same.

Figure 7C:
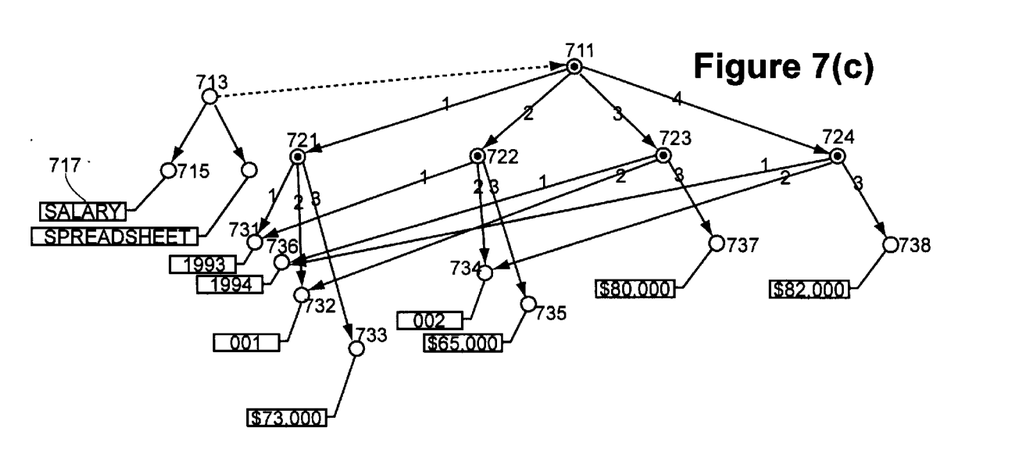
FIG. 7(c) shows the hyperbase of FIG. 7(b) after normalization.

The reader is referred to the Parent Invention for details of carrying out normalization according to one preferred embodiment of the Parent Invention and the present invention. To illustrate normalization by example, the unnormalized hyperbase of FIG. 7(b) becomes the hyperbase of FIG. 7(c) after normalizing according to the preferred embodiment of the present invention.

Integration

Integration is the process of combining several hyperbases to generate a single hyperbase. In one preferred embodiment of the method of the present invention, as in the Parent Invention, once all the heterogeneous databases to be searched have been converted into hyperbases, all the hyperbases are integrated into a single hyperbase. This step may be carried out before normalization or after normalization. However, it should be noted that integrating several normalized hyperbases does not guarantee a normalized combined hyperbase, so that normalization always should be performed after integration. In one preferred embodiment of the present invention, integration is carried out first. In that preferred embodiment, normalization is then carried on the resultant hyperbase to produce a hyperbase of Normal Form 2 to be searched.

It will be clear to one in the art that explicit integration is not a necessary step in practicing the present invention. The step of searching through all the heterogeneous databases in the set to be searched is carried out in an alternate embodiment on the hyperbases of the individual databases as if they had been combined into a single combined common structure such as a hyperbase. Furthermore, since no explicit conversion is necessary of each individual heterogeneous database to a common structure (e.g., a hyperbase) for that database, in yet another alternate embodiment, the step of searching as part of a query comprises processing the original databases as if they were represented by a single common data structure which would have resulted if each individual database in the set of heterogeneous databases was converted to a common structure such as a hyperbase.

Figure 8:
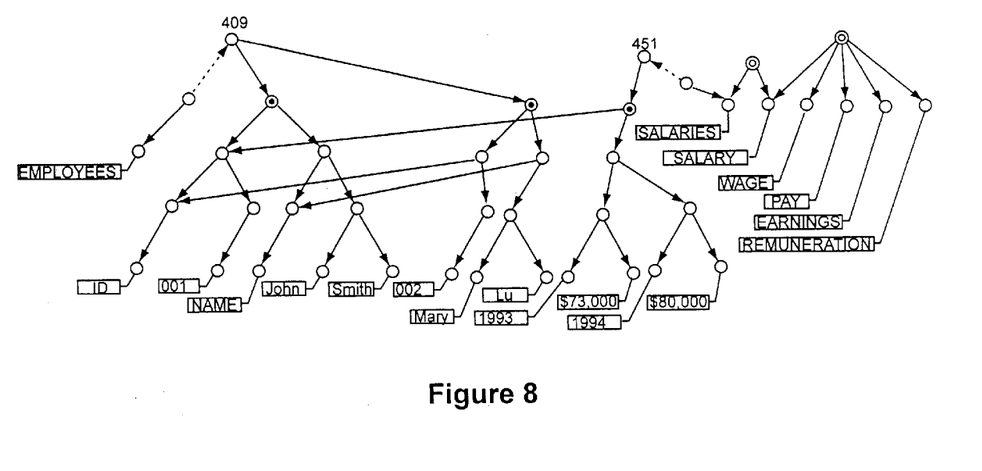
FIG. 8 shows the hyperbase which results from combining the hyperbases of the tables of FIG. 3 with the hyperbases of FIG. 6 of a thesaurus and stem, the combining step according to one embodiment of the method of the present invention.

To combine a number of hyperbases, one takes the logical union of all the hyperbases to form a single hyperbase. That is, the set of nodes of the resultant hyperbase is the union of the nodes of the original hyperbases, and the set of edges of the resultant hyperbase is the union of the edges of the original hyperbases. This process will be illustrated by combining the following four hyperbases: the hyperbase 409 shown in FIG. 4(b) of the table EMPLOYEES 301 of FIG. 3; the hyperbase 451 shown in FIG. 4(c) of the table SALARIES 311 of FIG. 3; the hyperbase 609 of a thesaurus shown in FIG. 6(a); and the hyperbase 611 of a stem shown in FIG. 6(b). The result of combining these hyperbases, then normalizing the result, is the hyperbase shown in FIG. 8.

E. Hyperbase Query: Carrying Out the Navigated Associative Search

According to the present invention, a query, in general, is an ordered list of words and a list of locations, with the possibility of one of these lists being empty. Using the terminology of this specification, one carries out a query on a set of heterogeneous databases by first determining the combined normalized hyperbase of all the structures in the set of heterogeneous databases, then supplying to the computer on which the method is implemented, via the input means, a list of labels and a list of locations from which to start the search. These locations typically, but not necessarily, will be the results of previous searches. Again, one of these lists might be empty. The result is that one obtains as output a list of answers, where each answer is itself a normalized hyperbase consisting of a subset of the combined hyperbase which contains the list of words. The list of answers is provided ordered according to a score (also called "distance"), with, preferably, the "best" answer (in the sense of minimum distance according to some distance criterion) provided first. In addition, each answer has an associated location, the location intuitively representing the main object of the answer. In the various alternative embodiments, different distance measurements are used to define the score. A measurement on a sub-hyperbase is a number determined from it.

The use of locations makes it possible for the user to issue successive incremental queries, each possible query relying on the output of a former query. The overall associative search is thus incremental and has navigation in that it may be guided by the user in a desired direction.

When issuing the first query, a user (or an application program) will provide only a set of labels. The result will be a list of answers, and for each answer, a location will be provided. In subsequent queries, the user (or application program) provides one or more locations and optionally, an additional list of labels (words). Alternatively, the user (or application program) can provide a list of labels with no location.

In the preferred embodiment, the object set and the forbidden set defining a location contain only one node each.

In a first preferred embodiment, a sub-hyperbase is an answer if (a) it is a connected sub-hyperbase; (b) it contains all of the input labels; (c) for each location, it contains at least one of the location's object nodes; (d) for each location, it does not contain any of the location's forbidden nodes; and (e) it contains at least one fact node. In an alternate embodiment, criteria (b), (c) and/or (d) are relaxed; it is not necessary for all input labels or for all the locations to be in the sub-hyperbase for it to be an answer. A minimum fraction of the input labels or locations must be in the answer. The distance measurement on a sub-hyperbase for such an alternate embodiment is the number of labels in the sub-hyperbase. In yet another embodiment, different labels or locations can be given different weights so that the presence of some labels in the sub-hyperbase is considered as more important than other labels. How to modify the first preferred embodiment described in detail in this specification to obtain these alternate embodiments will be clear to one in the art.

Optional distance measurement functions for sub-hyperbases

The following are different distance measurement functions on sub-hyperbases that can be used in a query in the method of the present invention:

1. Simple edge count. In this method, one counts the edges in the sub-hyperbase. Each edge is given the same weight.
2. Simple node count. In this variation, one counts the number of passes through the nodes in the sub-hyperbase, where, if there are n edges connected with a node, there are n−1 passes through that node.
3. Full edge count. In this variation, there is a price for each edge in the hyperbase.

4. Full node method. In this variation, there is a price for every pass through a node in the graph, where a pass is an edge-node-edge. If more than two edges are connected to a node, the price is the minimal group of n–1 passes.

5. Partial edge count method. In this variation, there is price for each "type" of edge, where for this purpose, a "type" is the pair of types of the edge and the node.

6. Partial node method. In this variation, there is a price for each "pass-type" through a node-type. A pass-type is defined by node type, the from direction, the from edge type, the to direction, the to edge type (e.g., up-edge, down-edge, up-equivalence-edge, etc., where up means backwards). Full details are provided below and in the code in the microfiche Appendix submitted herewith.

The preferred embodiment of this invention uses variation number 6. The details of the method are provided below, and use standard methods for finding minimal connected graphs that would be well-known to those in the art.

Detailed description of the query method in the preferred embodiment

The following is a description of the method for carrying out a query in one preferred embodiment of the present invention. The source code for this preferred embodiment is provided in the microfiche submitted herewith. Other alternate methods of carrying out the query step of the present invention using the same or different criteria for finding minimal hyperbases would be clear to one in the art.

The input to a query is a list of labels (words) and a list of locations. Either list may be empty. The method searches a hyperbase and determines the minimum hyperbase according to a "distance" criterion.

In the initialization stage of the query, each input label or location is converted to a set of nodes called a source. In the case of labels, each label is looked up in the hyperbase, and added to the hyperbase if not present. The node resulting from the lookup is the source corresponding to the label. In the case of a location, the object nodes of the location are taken to be a source. Additionally, the forbidden nodes of all input locations are collected into a set of forbidden nodes for the query. In this embodiment, both object node and forbidden sets contain only one node each.

An operation is a node N, together with some designation of arcs that have N as an endpoint. In the preferred embodiment, the set of arcs of an operation are designated by a direction D (D can be up to a parent or down to a child) and an edge type T (T can be a simple or an equivalence edge). The operation O=(N,D,T) then describes the node N, together with all arcs of type T connecting node N with parents (if D is up) or with children (if D is down).

At initialization, all possible operations are added for each of the nodes of each source.

Expanding an operation means taking all successors of the node N along the arcs of the operation (that is, all endpoints of these arcs except for node N) and creating all the possible operations for these successor nodes. Such a successor to N is denoted herein by N'. In the preferred embodiment, for any operation O defined by N, for every successor N' of N along the arcs of the operation one creates the operations (N', up, simple), (N', down, simple), (N', up, equivalence) and (N', down, equivalence).

The cost of an operation is the number of these successors N' to node N.

During expansion of an operation O, each new operation, denoted by O', is recorded as having O as a predecessor. The precedence arcs among operations correspond to hyperbase arcs among their nodes. Thus, the precedence relationship among operations describes a sub-hyperbase which starts with the source nodes, and is expanded by the expansion operations.

By construction, every non-cyclic path back from an operation along predecessors ends at a source node. Every such path is ascribed a measure of distance from its source, using a distance table. This is a lookup table defining distance increments, based on the type of the node N, and on the directions and edge types of the operation O=(N,D,T) and its predecessor O'=(N',D',T') The distance back from O along a path to a source is the distance back from its predecessor O' to the source, plus an effective increment. In the preferred embodiment, the effective increment in distance from an operation O' to a successor O is taken to be the increment specified by the distance table, divided by the number of sources to which there is path back from O'. Other effective increment measures can be used without deviating from the scope of this invention.

Some operation combinations may also be specified by the distance table as invalid, preventing the creation or expansion of such operations. Operations are also not created for the forbidden nodes of the query, as determined by the input.

Each operation has an associated state, determined by the attributes of its node, and by its predecessors and their states. Again, operations that are deemed to have an invalid state are not created or expanded.

In this embodiment, an answer is a connected sub-hyperbase that contains a fact node, contains at least one node from each of the sources of the query, and contains no forbidden nodes.

During the processing of the query, every operation has paths leading back to (nodes of) one or more sources of the query. A node is said to be fully connected if there are operations for the node that have paths back to the nodes of each one of the sources of the query. An answer is identified by a fully connected fact node, and consists of minimal-distance paths from that node to the sources.

The main routine in the preferred embodiment of the method maintains a record of all operations created during the course of the query, and of pending operations that have not been expanded yet. Initially, these are the operations that have been created for the sources (in all permissible directions and edge types).To generate answers, the method performs a series of expansion steps. Following each expansion step, one checks for answers, i.e., for fully connected fact nodes; if new answers are found, they are reported. This continues until no more answers are requested or no more answers may be found.

At each expansion step, the method expands a pending operation with the least distance, belonging to a source with minimal overall cost for pending operations. This has the effect of a breadth-first expansion (keyed by distance) from each of the sources separately, with alternation between the sources depending on the effort required to expand them.

If no pending operations remain for a source then it is deleted. If no pending operations remain for the query then it has no more answers.

Implementation of the above method in the form of computer source code is provided in the microfiche Appendix submitted herewith.

F. Data Display: Displaying the Result

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

After the query is performed, the answer(s) are output to the user. This is called data display.

There are several alternatives to displaying an answer to a query. An answer is itself a hyperbase, and a hyperbase can be displayed in various ways:

a. Displaying the hyperbase graphically on a graphic display or printer.

b. Displaying a nested set of labels> For example, ((ID 001)(NAME (John Smith)))

c. Displaying a minimal list of "display nodes" covering the hyperbase, where covering means that each element in the hyperbase is either a child or a parent of a fact.

d. Each display node could have its own particular (and possibly external) display method. A display node would then be displayed according to its particular display method.

e. The display method could use information about other nodes connected to the display node being displayed.

In addition to displaying an answer, the location of an answer may be displayed to the user. This may be done, for example, by highlighting the nodes of the location.

In one embodiment, an incremental search is carried out interactively with the user. In such an embodiment, the user or client application program is presented with a list of answers ordered by score. After each incremental query is carried out, newly determined answers are added to the list. The user or application program directs the next query increment of any overall search by activating or deactivating previous answers as points to start from. If any answer is activated, the position of that answer is added as input to the next query. Additional labels (words) may also be used as input.

Thus, an improved method for carrying out an associative search with navigation on heterogeneous databases is disclosed.

What is claimed is:

1. A method for searching a set of heterogeneous databases, each database in said set of heterogeneous databases having a corresponding hyperbase, said method implemented on a computer and comprising the steps of:

(a) determining each of the hyperbases corresponding to each of the set of heterogeneous databases dependent on whether the corresponding hyperbase is already determined;

(b) integrating each of the hyperbases corresponding to each database of said set of databases into a combined hyperbase dependent on whether the corresponding hyperbase is already integrated within said combined hyperbase;

(c) inputting a query into said computer, said query including a first set of one or more labels;

(d) determining a first answer from the combined hyperbase to said query;

(e) determining a first location from the combined hyperbase corresponding to said first answer;

(f) inputting an additional query into said computer, the additional query including a second set of labels and the first location; and (g) determining an additional answer from the combined hyperbase to the additional query, wherein said second set of labels may consist of no labels.

2. The method of claim 1 further comprising the step of:
(h) displaying said first answer.

3. The method of claim 1 wherein, if said combined hyperbase is not normalized, the method further comprises the step of:

(i) normalizing said combined hyperbase into a normalized hyperbase, and wherein in steps (d) and (e), the answer and the location are determined from the normalized hyperbase.

4. A method for accessing information from a heterogeneous plurality of databases with each of said databases having a plurality of data and each of said databases having a corresponding schema free data model, the method comprising the steps of:

(a) creating a combined schema-free data model from said plurality of data from some of said databases, said creating including:

(i) determining at least part of the corresponding schema-free data model for at least one of said some of said databases dependent on whether or not the at least part of the corresponding hyperbase for said at least one of some of said databases is already determined, and (ii) integrating said at least part of the corresponding schema-free data model into the combined schema-free model depending on whether or not said at least part already has been integrated in the combined schema-free data model; and (b) returning a search answer as a result of a navigated associative search on said combined schema-free data model for a set of one or more items of information, the set of items of information including either a set of one or more labels or a set of one or more locations or both.

5. The method of claim 4 wherein said set of items of information includes a set of one or more words.

6. The method of claim 4 wherein said set of items of information includes a set of one or more locations.

7. The method of claim 6 wherein at least one location in said set of locations includes a corresponding location object node and a corresponding location forbidden node.

8. The method of claim 4 wherein said navigated associative search further comprises the steps of:

(b1) searching said combined schema-free data model for a first set of one or more labels;

(b2) receiving a first answer from said combined schema-free data model, said first answer having a first corresponding location; and (b3) determining said first corresponding location.

9. The method of claim 4 wherein said combined schema-free data model is a hyperbase, said set of items of information includes a set of one or more input labels, and said search answer is a connected sub-hyperbase of the combined hyperbase, the sub-hyperbase including at least one of the input labels and a fact node.

10. The method of claim 6 wherein said combined schema-free data model is a combined hyperbase, said search answer is a connected sub-hyperbase of the hyperbase, the sub-hyperbase includes a fact node and includes one or more location object nodes of at least one location in the set of locations.

11. The method of claim 8 further comprising the steps of:

(b4) searching said combined schema-free data model for a second set of one or more labels and for said first corresponding location;

(b5) receiving a second answer from said combined schema-free data model, said second answer having a second corresponding location; and (b6) determining said second corresponding location.

12. The method of claim 6 wherein said navigated associative search further comprises the steps of:
- (b1) searching said combined schema-free data model for a first set of one or more labels and for at least one location of the set of locations;
- (b2) receiving a first answer from said combined schema-free data model, said first answer having a first corresponding location; and
- (b3) determining said first corresponding location.

13. The method of claim 12 further comprising the steps of:
- (b4) searching said combined schema-free data model for a second set of one or more labels and for said first corresponding location;
- (b5) receiving a second answer from said combined schema-fire data model, said second answer having a second corresponding location;
- (b6) determining said second corresponding location.

14. The method of claim 10 wherein one location of the set of locations includes one or more location forbidden nodes and the sub-hyperbase excludes the location forbidden nodes.

15. The method of claim 9 wherein said set of items of information includes a set of one or more locations and at least one of the locations in the set of locations includes one or more location object nodes.

16. The method of claim 9 wherein the connected sub-hyperbase includes all of the input labels in the set of input labels.

17. The method of claim 4 wherein said combined schema-free data model is a combined hyperbase, and the search answer includes a connected sub-hyperbase of the combined hyperbase, the sub-hyperbase including a maximum number of the items of information in said set of items of information.

18. An apparatus for searching a set of heterogeneous databases, each database in said set of heterogeneous databases having a corresponding hyperbase, said apparatus including a central processing unit (CPU) and a memory, said apparatus further comprising:
- (a) a hyperbase determination mechanism configured to determine said corresponding hyperbase for one of said set of heterogeneous databases, said hyperbase determination mechanism dependent on whether said a corresponding hyperbase is already determined;
- (b) an Integration mechanism using said CPU and said memory, configured to integrate the hyperbases corresponding to each of said set of databases into a combined hyperbase, the integration by said integration mechanism dependent on whether said corresponding hyperbase is already integrated within said combined hyperbase;
- (c) a query input mechanism using said CPU and said memory, configured to receive a query including a set of labels and a set of previously determined locations, the query including at least one label or one previously determined location;
- (d) an answer determination mechanism using said CPU and memory, configured to determine an answer to said query; and
- (e) a location determination mechanism using said CPU and said memory, configured to determine a location corresponding to said answer.

19. The apparatus of claim 18 further comprising:
- (f) a display and a displaying mechanism configured to display said answer on said display.

20. The apparatus of claim 18,
- (i) the apparatus further comprising
  - (g) a normalizing mechanism configured to normalize said combined hyperbase into a normalized hyperbase, and
- (ii) wherein the answer determination mechanism determines the answer from the normalized hyperbase and the location determination mechanism determines the location from the normalized hyperbase.

21. An apparatus for accessing information from a heterogeneous plurality of databases with each of said databases having a plurality of data, and each of said databases having a corresponding schema free data model, said apparatus including a central processing unit (CPU), a memory, and a file system containing said heterogeneous plurality of databases, said apparatus further comprising:
- (a) a model creation mechanism, using said CPU and said memory, configured to create from at least part of the corresponding schema-free data model for at least one of said databases dependent on whether or not the at least part of the corresponding hyperbase for said at least one of said databases has already been created, said creating including accessing said plurality of data in said at least one of said databases in said file system;
- (b) an integration mechanisms, using said CPU and said memory, configured to integrate said at least part of the corresponding hyperbase to a combined schema-free model depending on whether or not said at least part already has been integrated in the combined schema-free data model; and
- (c) a navigated associative search mechanism, using said CPU and said memory, the navigated associative search mechanism configured to accept as input a set of one or more items of information and to perform a navigated associative search on said combined schema-free data model created by the model creation mechanism and the integration mechanism, the performing returning a search answer from said combined schema-free data model for said input set of items of information, the input set of items of information including either a set of one or more labels or a set of one or more locations or both.

22. The apparatus of claim 21 wherein said set of items of information includes a set of one or more words.

23. The apparatus of claim 21 wherein said set of items of information includes a set of one or more locations.

24. The apparatus of claim 21 wherein at least one of the set of locations includes a corresponding location object node and a corresponding location forbidden node.

25. The apparatus of claim 21 wherein the navigated associative search mechanism further comprises:
- (a) a search mechanism using said CPU and said memory configured to search said combined schema-free data model for a first set of one or more labels and returning a first answer from said combined schema-free data model, said first answer having a first corresponding location; and
- (b) a location determining mechanism using said CPU and said memory, the location determining mechanism configured to determine said first corresponding location.

26. The apparatus of claim 21 wherein said combined schema-free data model is a combined hyperbase, said set of items of information includes a set of one or more input labels and said search answer is a connected sub-hyperbase of the combined hyperbase, the sub-hyperbase including at least one of the input labels and a fact node.

27. The apparatus of claim 23 wherein said combined schema-free data model is a combined hyperbase, said search answer is a connected sub-hyperbase of the combined hyperbase, the sub-hyperbase includes a fact node and includes one or more location object nodes of at least one location in the set of locations.

28. The apparatus of claim 25 wherein:
said search mechanism also is configured to search said combined schema-free data model for a second set of one or more labels and for said first corresponding location, returning a second answer from said combined schema-free data model, said second answer having a second corresponding location; and
the location determining mechanism also is configured to determine said a second corresponding location.

29. The apparatus of claim 23 wherein the navigated associative search mechanism further comprises:
(a) a search mechanism using said CPU and said memory configured to search said combined schema-free data model for a first set of one or more labels and returning a first answer from said combined schema-free data model, said first answer having a first corresponding location; and
(b) a location determining mechanism using said CPU and said memory, the location determining mechanism configured to determine said first corresponding location.

30. The apparatus of claim 29 wherein:
said search mechanism also is configured to search said combined schema-free data model for a second set of one or more labels and for said first corresponding location, remaining a second answer from said combined schema-free data model, said second answer having a second corresponding location; and
the location determining mechanism also is configured to determine said second corresponding location.

31. The apparatus of claim 27 wherein one of the locations of the set of locations includes one or more location forbidden nodes and the sub-hyperbase excludes the location forbidden nodes.

32. The apparatus of claim 26 wherein said set of items of information includes a set of one or more locations and at least one of the locations includes one or more location object nodes.

33. The apparatus of claim 26 wherein the connected sub-hyperbase includes all of the input labels in the set of input labels.

34. The apparatus of claim 21 wherein said schema-free data model is a combined hyperbase, and the search answer includes a connected sub-hyperbase of the combined hyperbase, the sub-hyperbase including a maximum number of the items of information in said set of items of information.

35. A computer program product comprising a computer usable storage medium with computer readable code embodied therein for causing a computer to search a set of heterogeneous databases, each database in said set of heterogeneous databases having a corresponding hyperbase, said computer readable code comprising:
(a) computer readable program code devices configured to cause said computer to effect a hyperbase determination mechanism configured to determine said corresponding hyperbase for one of said set of heterogeneous databases, said hyperbase determination mechanism dependent on whether said corresponding hyperbase is already determined;

(b) computer readable program code devices configured to cause said computer to effect an integration mechanism, configured to integrate the hyperbases corresponding to each of said set of databases into a combined hyperbase, the integration by said integration mechanism dependent on whether said corresponding hyperbase is already integrated within said combined hyperbase;
(c) computer readable program code devices configured to cause said computer to effect a query input mechanism configured to receive a query including a set of labels and a set of previously determined locations, the query including at least one label or one previously determined location;
(d) computer readable program code devices configured to cause said computer to effect an answer determination mechanism configured to determine an answer to said query; and
(e) computer readable program code devices configured to cause said computer to effect a location determination mechanism configured to determine a location corresponding to said answer.

36. The computer program product of claim of claim 35 wherein said computer readable code further comprises:
(f) computer readable program code devices configured to cause said computer to effect a displaying mechanism configured to display said answer.

37. The computer program product of claim of claim 35 wherein:
(i) said computer readable code further comprises
(g) computer readable program code devices configured to cause said computer to effect a normalizing mechanism configured to normalize said combined hyperbase into a normalized hyperbase, and
(ii) wherein the answer determination mechanism determines the answer from the normalized hyperbase and the location determination mechanism determines the location from the normalized hyperbase.

38. A computer program product comprising a computer usable storage medium with computer readable code embodied therein for causing a computer to access information from a heterogeneous plurality of databases with each of said databases having a plurality of data, and each of said databases having a corresponding schema free data model, said computer readable code comprising:
(a) computer readable program code devices configured to cause said computer to effect a data model creation mechanism configured to create from at least part of the corresponding schema-free data model for at least one of said databases dependent on whether or not the at least part of the corresponding hyperbase for said at least one of said databases has already been created, said creating including accessing said plurality of data in said at least one of said databases in said file system;
(b) computer readable program code devices configured to cause said computer to effect an integration mechanism configured to integrate said at least part of the corresponding hyperbase to a combined schema-free model depending on whether or not said at least part already has been integrated in the combined schema-free data model; and
(c) computer readable program code devices configured to cause said computer to effect a navigated associative search mechanism, the navigated associative search mechanism configured to accept as input a set of one or more items of information and to perform a navigated associative search an said combined schema-free data model created by the model creation mechanism and the integration mechanism the performing returning a search answer from said combined schema-free data model for said input set of items of information, the input set of items of information including either a set of one or more labels or a set of one or more locations or both.

39. The computer program product of claim 38 wherein said set of items of information includes a set of one or more words.

40. The computer program product of claim 38 wherein said set of items of information includes a set of one or more locations.

41. The computer program product of claim 40 wherein at least one of the set of locations includes a corresponding location object node and a corresponding location forbidden node.

42. The computer program product of claim 38 wherein the navigated associative search mechanism further comprises:
 (a) computer readable program code devices configured to cause said computer to effect a search mechanism, the search mechanism configured to search said combined schema-free data model for a first set of one or more labels and returning a first answer from said combined schema-free data model, said first answer having a first corresponding location; and
 (b) computer readable program code devices configured to cause said computer to effect a location determining mechanism, the location determining mechanism configured to determine said first corresponding location.

43. The computer program product of claim 38 wherein said combined schema-free data model is a combined hyperbase, said set of items of information includes a set of one or more input labels and said search answer is a connected sub-hyperbase of the combined hyperbase, the sub-hyperbase including at least one of the input labels and a fact node.

44. The computer program product of claim 40 wherein said combined schema-free data model is a combined hyperbase, said search answer is a connected sub-hyperbase of the combined hyperbase, the sub-hyperbase includes a fact node and includes one or more location object nodes of at least one location in the set of locations.

45. The computer program product of claim 42 wherein:
 said search mechanism also is configured to search said combined schema-free data model for a second set of one or more labels and for said first corresponding location, returning a second answer from said combined schema-free data model, said second answer having a second corresponding location; and
 the location determining mechanism also is configured to determine said second corresponding location.

46. The computer program product of claim 40 wherein the navigated associative search mechanism further comprises:
 (a) computer readable program code devices configured to cause said computer to effect a search mechanism, the search mechanism configured to search said combined schema-free data model for a first set of one or more labels and returning a first answer from said combined schema-free data model, said first answer having a first corresponding location; and
 (b) computer readable program code devices configured to cause said computer to effect a location determining mechanism the location determining mechanism configured to determine said first corresponding location.

47. The computer program product of claim 46 wherein:
 said search mechanism also is configured to search said combined schema-free data model for a second set of one or more labels and for said first corresponding location, returning a second answer from said combined schema-free data model, said second answer having a second corresponding location; and
 the location determining mechanism also is configured to determine said a second corresponding location.

48. The computer program product of claim 44 wherein one of the locations in the set of locations includes one or more location forbidden nodes and the sub-hyperbase excludes the location forbidden nodes.

49. The computer program product of claim 43 wherein said set of items of information includes a set of one or more locations and at least one of the locations includes one or more location object nodes.

50. The computer program product of claim 43 wherein the connected sub-hyperbase includes all of the input labels in the set of input labels.

51. The computer program product of claim 38 wherein said combined schema-free data model is a combined hyperbase, and the search answer includes a connected sub-hyperbase of the combined hyperbase, the sub-hyperbase including a maximum number of the items of information in said set of items of information.

* * * * *